Sept. 1, 1964 D. E. HILL 3,147,412

JUNCTION RECTIFIER OF BORON PHOSPHIDE HAVING
BORON-TO-PHOSPHORUS ATOMIC
RATIO OF 6 TO 100

Filed Oct. 27, 1960 4 Sheets-Sheet 1

INVENTOR.
DALE E. HILL

BY Herman O. Bauermeister

INVENTOR.
DALE E. HILL
BY Herman O. Bauermeister

Sept. 1, 1964 D. E. HILL 3,147,412
JUNCTION RECTIFIER OF BORON PHOSPHIDE HAVING
BORON-TO-PHOSPHORUS ATOMIC
RATIO OF 6 TO 100
Filed Oct. 27, 1960 4 Sheets-Sheet 3

INVENTOR.
DALE E. HILL

BY Herman O. Bauermeister

INVENTOR.
DALE E. HILL

BY Herman O. Bauermeister

United States Patent Office
3,147,412
Patented Sept. 1, 1964

3,147,412

JUNCTION RECTIFIER OF BORON PHOSPHIDE HAVING BORON - TO - PHOSPHORUS ATOMIC RATIO OF 6 TO 100

Dale E. Hill, Dayton, Ohio, assignor to Monsanto Company, a corporation of Delaware Filed Oct. 27, 1960, Ser. No. 65,539
19 Claims. (Cl. 317—237)

Figure 1:
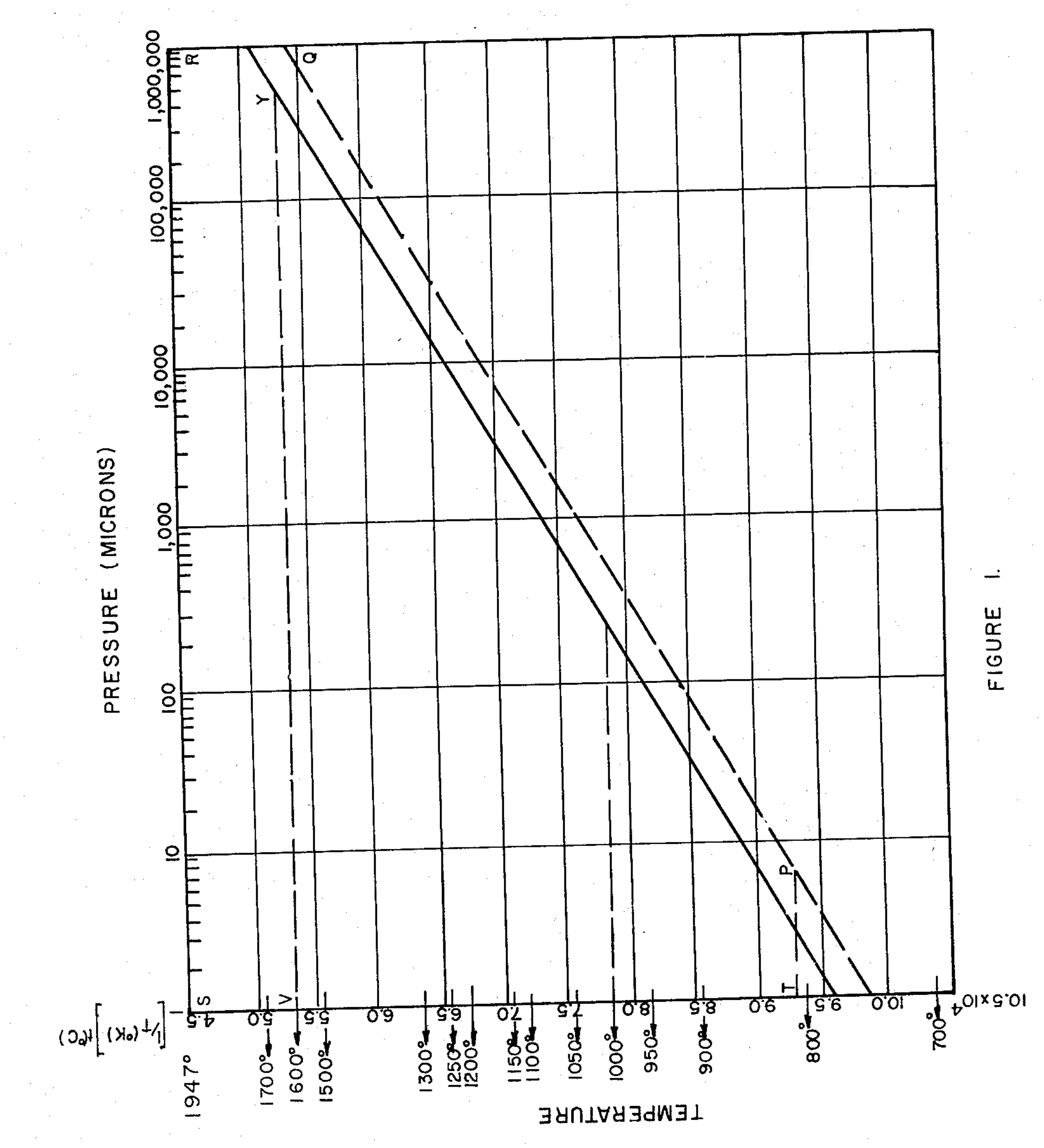

This invention relates to a power rectifier or diode usable at high temperatures having a new crystalline boron phosphide as the semiconductor body or element thereof.

It is a primary object of this invention to provide a power rectifier or diode that will operate at high temperatures, that is, temperatures up to about 2000° C.

This and other objects of the invention will become apparent as the detailed description of the invention proceeds.

Crystalline rhombohedral boron phosphides having a boron-to-phosphorus atomic ratio of at least 6 to 1 have been found to be especially suitable for high temperature use. The preferred material is the boron phosphide $B_6P$. Optical measurements indicate that these new crystalline boron phosphides have a forbidden energy gap of about 2.0 electron volts. This compares with silicon having a forbidden energy gap of about 1.12 electron volts and germanium having a forbidden energy gap of about 0.7 electron volt. Germanium can only be used as a rectifier at temperatures up to about 80° C. Silicon can be used at higher temperature than germanium, that is, about 200° to 225° C., but cannot be used at temperatures even approaching that at which the new crystalline boron phosphides can be used, that is, up to about 2000° C.

Crystalline boron phosphides herein described exhibit the usual negative temperature coefficient of resistance of a semiconductor. The compound BP, although operable at higher temperatures than silicon or germanium is thermally stable only up to about 1000° C., whereas the new crystalline boron phosphides used in this invention are thermally stable at from 20 to 100 percent higher temperatures than the maximum BP operating temperature.

The thermal stability of the group of boron phosphides having boron-to-phosphorus atomic ratios of at least 6 to 1 is a characteristic property which readily distinguishes this boron-rich group from the elementary boron phosphide, BP. At temperatures above 1000° C., BP evolves phosphorus copiously resulting in a deleterious atmosphere of phosphorus on and around the components of the rectifier device which is corrosively destructive of the operation thereof. Coincidental with this evolution of phosphorus is a breakdown of the physical structure of the BP component due to a collapse of its cubic crystalline structure. On the other hand, the boron phosphides described herein are not cubic crystalline in form, hence, even when phosphorus is lost, at much higher temperatures than 1000° C., there is no physical breakdown of the rectifier component. And, since the phosphorus content of the instant boron phosphides is much lower than in BP, there is less phosphorus to evolve into a deleterious atmosphere thereof around the components of the rectifier device. As a consequence, the boron phosphides described and claimed herein are far superior to BP, being operable at higher temperatures for longer periods of time with less danger of corrosion of the rectifier components.

As an illustration of the comparative thermal stability of the compounds BP and $B_6P$ (representative of the new class of boron phosphides), when BP is heated to a temperature of 1100° C. at 100 microns of Hg pressure, it immediately begins to lose phosphorus and to decompose until after about 40 hours the BP is transformed completely to $B_6P$. At 1200° C. and 100 microns of Hg pressure BP decomposes still more rapidly until after only about 3 hours, it is transformed completely to $B_6P$. On the other hand, $B_6P$ is thermally stable at 1200° C. and 100 microns of Hg pressure.

Figure 6:
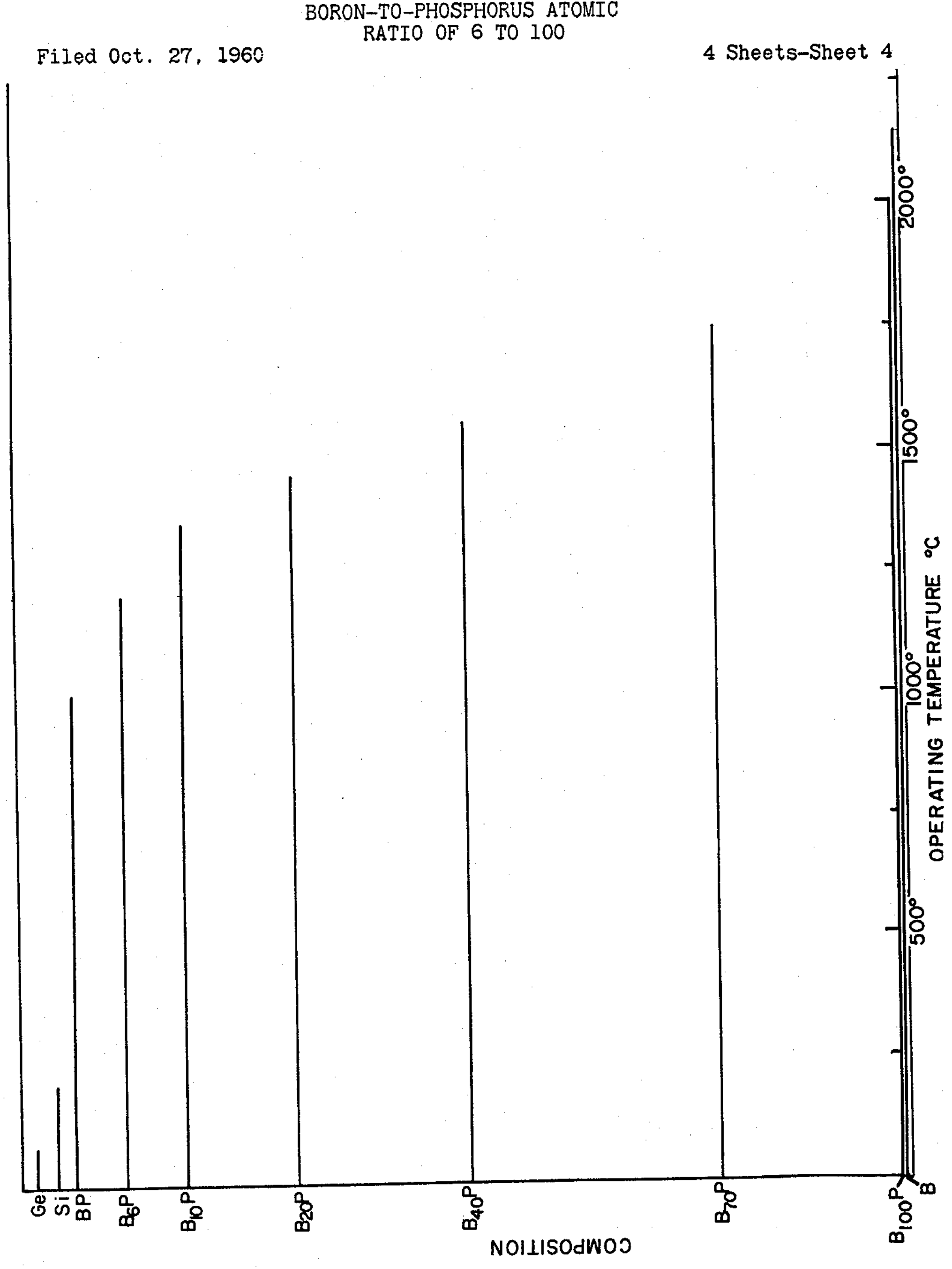

FIGURE 6 is a graph showing the approximate operating temperatures of various elements and boron phosphide compounds and compositions in semiconductor applications. It is apparent that the new crystalline boron phosphides of the present invention, having a boron-to-phosphorus ratio of at least 6 to 1 are operable at temperatures far exceeding prior art materials.

The new crystalline rhombohedral boron phosphides used in the present invention are extremely hard, thermally stable and chemically inert.

The novel forms of crystalline boron phosphide used herein may be prepared by a chemical reaction between elemental boron and elemental phosphorus, by thermal decomposition of boron phosphide having the formula BP, by the reaction of elemental boron with BP, by reaction of elemental boron with the compound phosphine, $PH_3$, or by the reaction of a phosphorus source, such as ferrophosphorus or crude phosphate ore, with a boron source, such as elemental boron, crude borax, or other boron compound, in a molten inorganic matrix, such as molten metals or salts thereof.

While the above-described methods may be used to prepare any of the crystalline boron phosphides having a boron-to-phosphorus atomic ratio of at least 6 to 1, they are particularly useful for preparing the stoichiometric compound $B_6P$. However, a more preferred method for preparing higher boron phosphides, i.e., those having boron-to-phosphorus atomic ratios greater than 6 to 1, consists of heating the compound $B_6P$ under specific conditions set forth hereinafter. This method is preferred because it is susceptible to more accurate means of control for obtaining specific compositions within the above ratio than are the earlier named methods for obtaining the same compositions.

The following specific examples illustrate methods of preparation of the new crystalline boron phosphides used herein under equilibrium conditions:

*Example 1*

Transformation of the simple form of boron phosphide having the formula, BP, to the crystalline form having the formula, $B_6P$, was conducted by placing 100 g. of boron phosphide in finely divided form in a graphite crucible in a porcelain tube located in an electric furnace. The porcelain tube was connected to a vacuum system which could be maintained at 50 microns of Hg pressure. The electric furnace was brought up to a temperature of 1200° C. and maintained constant. It was found that the evolution of phosphorus during a 12 hour period yielded a residual product having the formula $B_6P$. It was also found that the starting material could be either amorphous boron phosphide or the cubic crystalline form with the production of the same ultimate product.

The critical consideration required for the transformation of BP to $B_6P$ is that the system be operated such that the partial pressure of phoshorus be less than that of the decomposition pressure of boron phosphide at the ambient temperature.

In the present example, the operating pressure of the furnace and the temperature at which it is maintained were such that the transformation of BP to $B_6P$ were aided by permitting the evolved phosphorus resulting from the dissociation to be removed from the reaction zone (by means of the vacuum collection system). The temperature in the phosphorus collection zone was maintained at a relatively low value by the use of a water condenser, that is, the pressure of the phosphorus source which was thus lower than the disociation pressure of phosphorus or the product, thus allowing the desired reaction to procceed.

After the processing described above, the produce having the formula $B_6P$ was found to be a gray powder of unusual hardness. It was found that the gray powder was harder than silicon carbide, and had a hardness of the Moh scale between 9.0 and 9.7.

X-ray diffraction analysis also detected the existence of a unique crystalline composition for the above sample different from that of BP.

*Example 2*

The reaction of elemental boron with elemental phosphorus for the production of $B_6P$ was carried out by charging 0.4176 g. of amorphous boron into a graphite crucible which had been prepared by drilling a 5/16" hole in a cylindrical piece of ½" graphite rod. The charged crucible was placed in a ¾" outside diameter ceramic tube 10" long, closed at the end nearest the sample. One-half of this ceramic tube was located in a high temperature furnace, while the other end was placed in an adjacent low temperature furnace, without any cold zone between the two furnaces.

The other end of the ceramic tube was then charged with 1.976 g. of amorphous red phosphorus, after which the tube was evacuated and sealed.

The tube was located in the two adjacent furnaces which were then gradually brought up to the desired temperature. The hot end was maintained at a temperature of 1100° C., while the temperature of the phosphorus end was maintained at 111° C. to volatilize the phosphorus and to maintain a phosphorus partial pressure of about 1000 microns of Hg.

The heating of the reaction system caused the phosphorus to vaporize with the result that the phosphorus vapor filled the entire tube at the desired pressure. The phosphorus vapor then reacted with the hot boron contained at the other end of the tube. It was found that at the end of a heating period of about 24 hours, that the boron had been transformed substantially completely to the compound $B_6P$. A similar experiment conducted at 1200° C. was also found to give a substantially quantitative yield of $B_6P$. In general, the operating pressure which yields the desired $B_6P$ instead of BP is in the range of 1 to 1,000,000 microns of Hg at temperatures between 800° C. and 1947° C. Thus, at 1000° C., a pressure of 100 microns of Hg gives $B_6P$, while a pressure of 1570 microns gives BP.

In the present example, the use of a shaped charge of starting material, that is, the boron located in the drilled cavity in the graphite crucible, resulted in the production of a similar and identically shaped product of $B_6P$. This shaped article was found to be stable at high temperatures.

The $B_6P$ product was found to have a bulk density of 2.45. However, the ultimate density of individual homogeneous particles varies between 2.60 and 2.72. In contrast, cubic boron phosphide, BP, has a theoretical X-ray density of 2.97.

In this example, as in the preceding example, the condition of the formation of $B_6P$ is that the system be operated such that the partial pressure of phosphorus is less than that of the decomposition pressure of BP at the ambient temperature.

The higher boron phosphides, i.e., those having a boron-phosphorus atomic ratio greater than 6 to 1, are also prepared in accordance with this method by adding progressively less phosphorus to obtain the higher B–P ratios. For example, 9.6 gm. of phosphorus reacted with 67.65 gms. of boron produced $B_{20}P$, 4.84 gms. of phosphorus with 67.65 gms. of boron produces $B_{40}P$, 2.76 gms. of phosphorus reacted with 67.65 gms. of boron produces $B_{70}P$, and 1.94 gms. of phosphorus produces $B_{100}P$.

*Example 3*

The production of the compound $B_6P$ from BP reacted with excess elemental boron was carried out at a series of temperatures above 1000° C. The BP was employed as a finely divided crystalline powder, while the boron was also in a finely divided form of less than 100 mesh particle size. The two components were mixed and charged to a graphite crucible having an internal and external element which fitted loosely together with the space between the two portions forming a nose cone such as was adaptable for use in a rocket. The intimately mixed combination of BP and elemental boron (5 moles of boron per mole of boron phosphide) was heated to a temperature of 1300° C. for a period of 18 hours in an inert gas atmosphere. At the end of this time, a charged crucible was cooled and the test piece removed. It was found that the BP had been transformed substantially completely to crystalline $B_6P$ which was very hard and which could be subjected to oxidizing or reducing flames without substantial deterioration.

This same procedure is used to obtain the higher boron phosphides by increasing proportionately the amount of elemental boron required to react with BP to produce the desired boron-phosphorus ratio.

*Example 4*

The formation of $B_6P$ by the reaction of boron trichloride as the boron source with hydrogen in elemental phosphorus as the phosphorus source was carried out by introducing the respective zones into a reactor from the respective gas phases. The elemental phosphorus was provided by bubbling a stream of hydrogen through a heated pool of phosphorus, yellow form. The gas, heated with phosphorus, was directed into a heated reaction vessel, into which gaseous boron trichloride was also flowing. At temperatures of 1100° C., the action between boron trichloride and the phosphorus results in the formation of the crystalline product, $B_6P$. However, it is essential that the conditions be such that the partial pressure of phosphorus be less than that of the decomposition pressure of BP at the ambient temperature.

This same procedure is used to obtain the higher boron phosphides by increasing proportionately the amount of boron trichloride required to supply sufficient free boron to react with elemental phosphorus to produce the desired boron-phosphorus ratio.

*Example 5*

The production of $B_6P$ by the reaction of elemental boron as the boron source in solid form with phosphine, $PH_3$, as the phosphorus source supplied in gas form was conducted in a ceramic tube located in an electric furnace. A 10 g. sample of elemental boron held in the furnace for a period of 12 hours with the continuous passage of phosphine over the boron was found to result in a substantially complete transformation to $B_6P$. The necessary condition for the reaction was that the partial pressure of phosphorus be less than that of the decomposition pressure of boron phosphide at the ambient temperature.

This method was also found to yield the desired $B_6P$ by the reaction of the said elemental solid form of boron with elemental phosphorus carried in an inert gas stream, preferably hydrogen, although argon or nitrogen can also be used.

The higher boron phosphides are similarly prepared by adjusting upwardly the proportion of elemental boron to phosphine required to produce the desired higher boron-phosphorus ratio.

*Example 6*

The formation of hexaboron phosphide, $B_6P$, in an inorganic melt was carried out by the reaction of crystalline BP with a 10 molar excess of elemental boron. This reaction was carried out in a ferro-melt by first forming BP from ferro-boron in ferrophosphorus. This resulted in the production of the finely dispersed form of BP in the molten iron matrix. The 10 molar excess of elemental boron was then stirred into the molten reaction medium. This was maintained at a temperature of 1400° C. for a period of 24 hours. At the end of this time, the reaction mass was cooled, after which the iron content was removed by solution in sulfuric acid. The residual, insoluble sludge was then washed, treated with hydrofluoric acid and the crystalline form of hexaboron phosphide, $B_6P$, recovered as the ultimate product. The criterion for the formation of the $B_6P$ is that the system be operated such that the partial pressure of phosphorus be less than that of the decomposition pressure of BP at ambient temperatures greater than 800° C. throughout the entire process.

FIGURE 1 shows the equilibrium process operating region which has been found to yield the preferred product $B_6P$. This is the range of phosphorus pressure below the line PQR (area PQRST where R and Q are intercepts on the 1,000,000 micron of Hg pressure line) and preferably below the line XY (area VWXY). The lower limit of this operating range is the pressure one micron of Hg. The broader operating temperature range is, as shown in FIGURE 1, from 800° C. to 1947° C., the preferred range being from 1000° C. to 1600° C. The pressure range is from 1 to 1,000,000 microns of Hg, the preferred range being represented by the line XY.

While the above examples describe the preparation of the desired crystalline boron phosphides, it will be noted that FIGURE 1 represents equilibrium conditions for producing $B_6P$. Higher crystalline boron phosphides, i.e., those having boron-to-phosphorus atomic ratios greater than 6 to 1 may also be prepared under similar non-equilibrium conditions at temperatures between 800° C. and 2100° C. and pressures of 1 micron of Hg to 100 atmospheres. However, a more preferred method for obtaining the higher boron phosphides consists in heating the compound hexaboron phosphide $B_6P$ under specific conditions set forth hereinafter. This method is preferred because it is susceptible of more accurate means of control for obtaining specific higher boron phosphide compositions than are the earlier discussed methods.

The preferred procedure for obtaining higher boron phosphides is based upon the fact that when hexaboron phosphide is heated within a temperature range of from 800° C. to 2100° C. and within a pressure range of from 1 micron of Hg to 100 atmospheres it undergoes a progressive weight loss due to evolution of phosphorus until the desired crystalline boron phosphide is obtained as determined by a continuous measurement of the hexaboron phosphide sample. For each boron phosphide there in a definite weight loss value. When the sample has lost a specific weight, the *B/P* ratio for that weight loss represents the composition of the resultant boron phosphide.

There are several methods available for continuously measuring the weight loss of the sample, the more common ones being by use of a quartz spring balance in conjunction with a cathetometer, a simple spring balance or a train gauge. These devices are commercially available.

By following the above procedure any of the boron phosphides having a boron-phosphorus atomic ratio greater than 6 to 1 is obtained. The reaction rate is controlled by manipulating the temperature and pressure as desired.

As a variation of this procedure one may substitute for the $B_6P$ sample, any other higher boron phosphide and thermally treat it to obtain a still higher boron phosphide.

The crystalline boron phosphides used herein can be doped with various materials to produce the desired n- or p-type semiconductor. Doping is known in this art as adding small amounts of foreign materials to change the degree and/or type of a semiconductor material. The treating or doping agent treatment used is a method of controlling the degree of electronic (or positive hole) conduction in the semiconductor. The degree of conduction varies with the amount or type of doping agent used. For example, if it is desired, during the process of producing $B_6P$ by any of the above methods, a volatile halide of a Group II–B element, i.e., zinc, cadmium or mercury, magnesium or beryllium can be added to the reactants in minor amounts to give p-type $B_6P$. If an n-type $B_6P$ is desired, a Group VI–B element, i.e., oxygen, sulfur, selenium or tellurium, can be added during the process in trace amounts. In practice, during the process of making the $B_6P$, whether doping agents are added or not, sufficient impurities will normally be picked up by the $B_6P$ being formed to make it either n- or p-type. Doping of the $B_6P$, of course, can be done after the formation of the crystalline product by diffusion of the doping agents into the crystalline structure at elevated temperatures, but normally it is preferred to do the doping during the manufacture of the boron phosphide.

Doping the boron phosphide, e.g., $B_6P$, after the formation thereof, can be carried out as follows: The $B_6P$ is heated to a temperature of about 1100° C. and subjected to a trace amount of the vaporized doping element which is allowed to diffuse into the $B_6P$ crystal. Normally, long periods of time will be required for this type of doping procedure, possibly several days. When it is determined that sufficient doping material has diffused throughout the crystal of $B_6P$, the crystal is rapidly quenched, reducing the temperature to room temperature. This, of course, is the conventional diffusion and quench method used for doping semiconductor materials after the crystalline material has been made. If the material is cooled slowly, rather than being quenched rapidly, the doping agent will diffuse right out of the lattice again. Quenching traps the doping agent within the crystal.

Broadly speaking, the power rectifier or diode of the invention usable at high temperatures comprises a $B_6P$ semiconductor body, a conducting film coating the bottom side of the semiconductor through which a high melting point conductor is attached to the semiconductor body forming an ohmic junction thereon, and a rectifying contact electrode forming a P-N junction as a part of the device.

The invention will be more clearly understood from the following detailed description of specific examples thereof read in conjunction with the accompanying drawings:

*Example 7*

Figure 2:
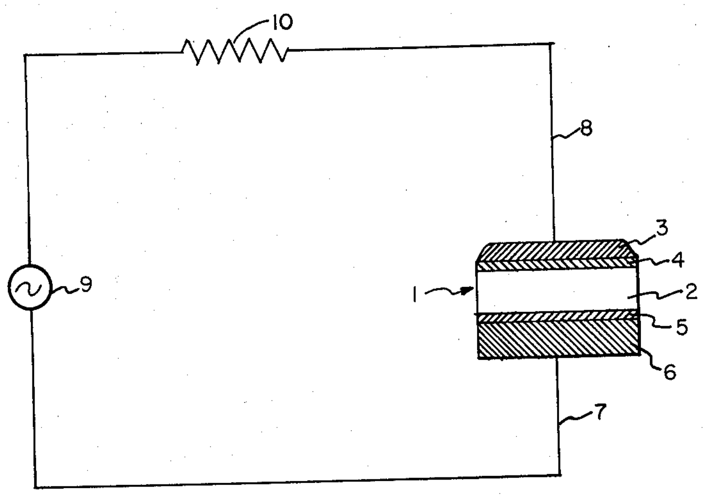

In FIGURE 2 is shown power rectifier 1 designed for high temperature operation with accompanying circuitry. A single crystal of $B_6P$ having n-type conductivity constitutes semiconductor body 2 of the rectifier. Suitably, semiconductor body 2 is in the form of a thin disc or wafer. To form the rectifying contact of the semiconductor body, tungsten conductor 3, having 10% by weight based on tungsten of cadmium incorporated therein is fused to one side of disc 2. This fusion is accomplished by soldering, welding, or fusion, e.g., by pressing the conductor against one side of disc 2 at an elevated temperature of about 1100° C. and allowing sufficient time for cadmium in the tungsten to diffuse into the surface of disc 2 thereby forming a p-type conductivity zone 4 of $B_6P$. Conductor 3 normally covers almost the entire upper surface of disc 2, usually greater than 90% thereof.

An ohmic junction is made to the other side of disc 2 by coating the bottom side with a conducting surface, e.g., a silver or other noble metal paint film 5 to make ohmic contact therewith and to provide a conducting surface for fusing, soldering, or welding to the disc electrode 6 which suitably is a gold-plated nickel electrode, molybdenum or tungsten containing 10% by weight, based on the metal used, of tellurium. A suitable solder is lead-tin eutectic alloy having some cadmium therein.

Electrical leads 7 and 8 are connected to electrodes 6 and 3, respectively, by soldering and to an alternating current source 9 through electrical load 10. The direct current voltage resulting from the rectifier current flowing in the system will appear across resistor 10. Suitably, alternating current source 9 can be a 110 volt, 60 cycle source or other alternating current source of higher or lower voltage.

Another method of making ohmic contact with wafer 2 is to omit the noble metal paint film from the lower surface of wafer 2 and to connect the electrode 6 directly to disc 2 in the same manner by which electrode 3 is fused to the $B_6P$ wafer. In this method, electrode material 6 contains a minor amount, i.e., not more than 20%, of an element which will produce n-type conductivity (when wafer 2 is n-type), e.g., oxygen, sulfur, selenium, or tellurium, i.e., Group VI–B elements. Group II–B elements, i.e., zinc, cadmium or mercury, magnesium and beryllium give p-type conductivity.

Ohmic contact can also be made to n- or p-type $B_6P$ by the use of tungsten coated with tellurium or cadmium, respectively. Molybdenum can be substituted for tungsten for this purpose.

Instead of forming the N-P junction between conductor 3 and wafer 2, wafer 2 can be manufactured having an internal N-P junction. Starting with n-type $B_6P$, a rectifying junction can be made by diffusing a Group II–B element, i.e., zinc, cadmium or mercury, magnesium, or beryllium into one side of the wafer, producing a p-type surface. On the other hand, starting with p-type $B_6P$, a rectifying junction can be made by diffusing a Group VI–B element, i.e., oxygen, sulfur, selenium or tellurium, into one side of the wafer producing an n-type surface.

Another method for making a rectifying junction is to add the proper doping material, or to change the type of doping material (from zinc, cadmium, mercury, magnesium or beryllium to oxygen, sulfur, selenium or tellurium) during the growth of the crystals.

Still another method of producing rectifying junctions is the heating of an n-type BP wafer to high temperature (about 1200° C.) in vacuum. In this case, phosphorus is lost by out-diffusion which results in the p-type boronridge, layer on the surface of the resultant $B_6P$.

With P-N junctions formed by any of the above methods, contact can be made to the n- or p-type side using tungsten alloy with tellurium or cadmium, respectively, in amounts mentioned hereinafter.

If it is desired, power rectifier 1 may be encapsulated with, e.g., glass, quartz, mica, etc., by means well known to the art.

Figure 3:
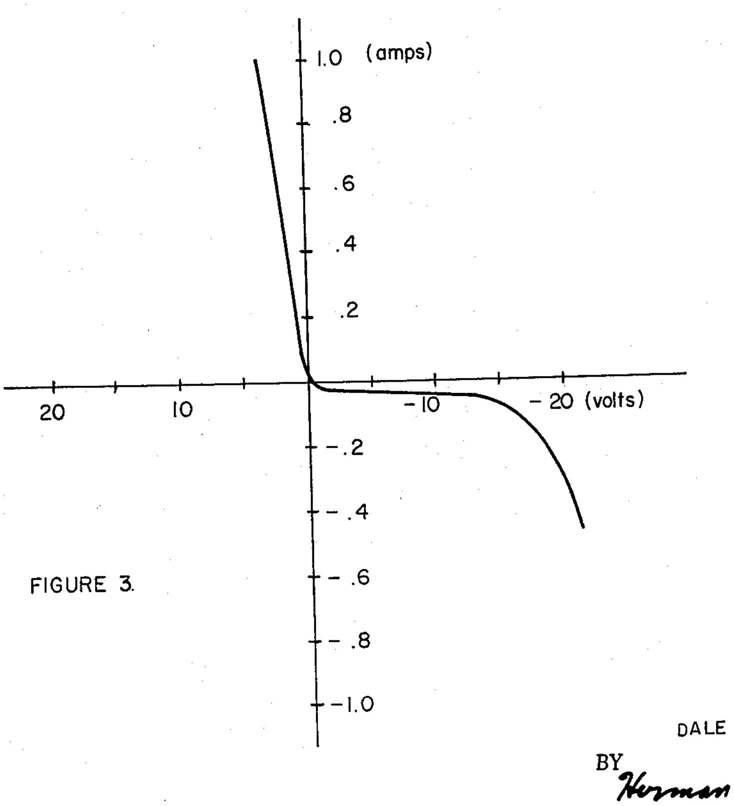

FIGURE 3 is a graph of the data obtained, being a plot of the voltage in volts vs. the current flowing through the rectifier in amperes and indicates a rectification ratio of about 100:1 and a back-voltage of 20 volts without breakdown of the rectifier.

When Example 7 is repeated using other higher boron phosphides of this invention, comparable rectification ratios and back-voltage resistances are obtained.

*Example 8*

Figure 4:
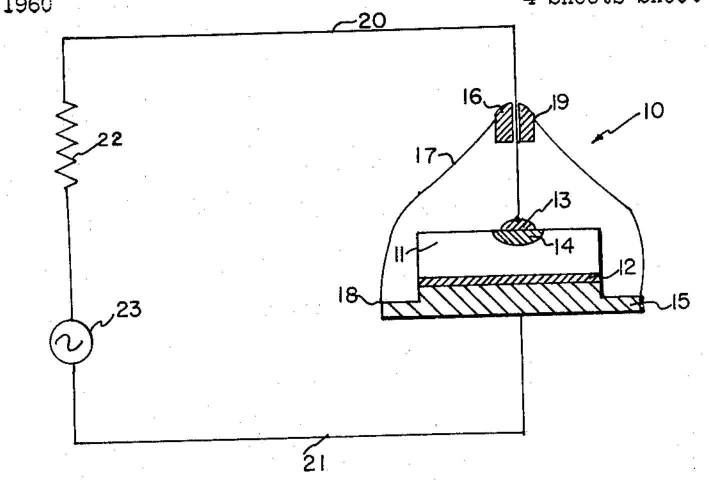

Another embodiment of this invention is shown in FIGURE 4 which represents a diode, 10, designed for high temperature operation with accompanying circuitry. A single crystal of $B_6P$ having n-type conductivity constitutes body 11 of the diode. Suitably, this body is in the form of a thin disc or wafer. On the external surface of body 11 is fused a tiny bead of a conducting material 13, to form a rectifying contact with body 11 through a p-type zone 14 of $B_6P$. This conducting material suitably is tungsten, having 10% by weight based on tungsten, of cadmium incorporated therein. The bead 13 is much smaller in size (less than 10%) with respect to the conductor 3 in the power rectifier of FIGURE 2 and in ratio to the mass of body 11, in FIGURE 4. In like manner, the P-N junction zone 14 is formed in only a small central area of body 11, whereas the P-N junction in FIGURE 2 covers almost, if not all of (greater than 90% of) the entire upper surface of body 2. The effect and advantage of this is to permit less current to flow through the diode than is normally used in power rectifier applications, thereby providing a semiconductor device usable where small quantities of current are desired.

Fusion of the conductor bead 13 to body 11 is accomplished by pressing the conductor against one side of disc 11 at an elevated temperature of about 1100° C. and allowing sufficient time for cadmium in the tungsten conductor to diffuse into the surface of disc 11, thereby conductor 13 is fused, soldered, or welded to disc 11.

An ohmic junction is made to the other side of disc 11 by fusing a tungsten electrode 15 having 10% by weight based on tungsten of tellurium therein to the bottom portion of disc 11 which has been coated with a film 12 of silver or other noble metal paint to provide a conducting surface for soldering or welding electrode 15 to disc 11 in a similar manner to that described for fusing conductor 13 to the other side of disc 11.

Other methods of making ohmic contact with disc 11 are described in Example 7.

Alternating current source 23 is applied to diode 10 through resistor 22 and electrical lead wires 20 and 21, with lead wire 20 passing to the conductor 13 through lead-through 16, which suitably is quartz, glass, mica, or the like. The rectified voltage appears across resistor 22.

The diode shown in FIGURE 4 is encapsulated, capsule 17 having glass-to-metal, or the like, seals at 18 and 19. If the diode 10 is not to be encapsulated, and would be subjected to an oxidizing atmosphere at high temperature, it is preferred to use tungsten, molybdenum, or other high-melting point material as electrical lead wires 20 and 21 which are soldered, welded or fused to conductors 13 and 15, respectively.

While Example 8 illustrates n-type $B_6P$ as the semiconductor body, p-type $B_6P$ is also contemplated, using conductors having opposite conductivity type.

Figure 5:
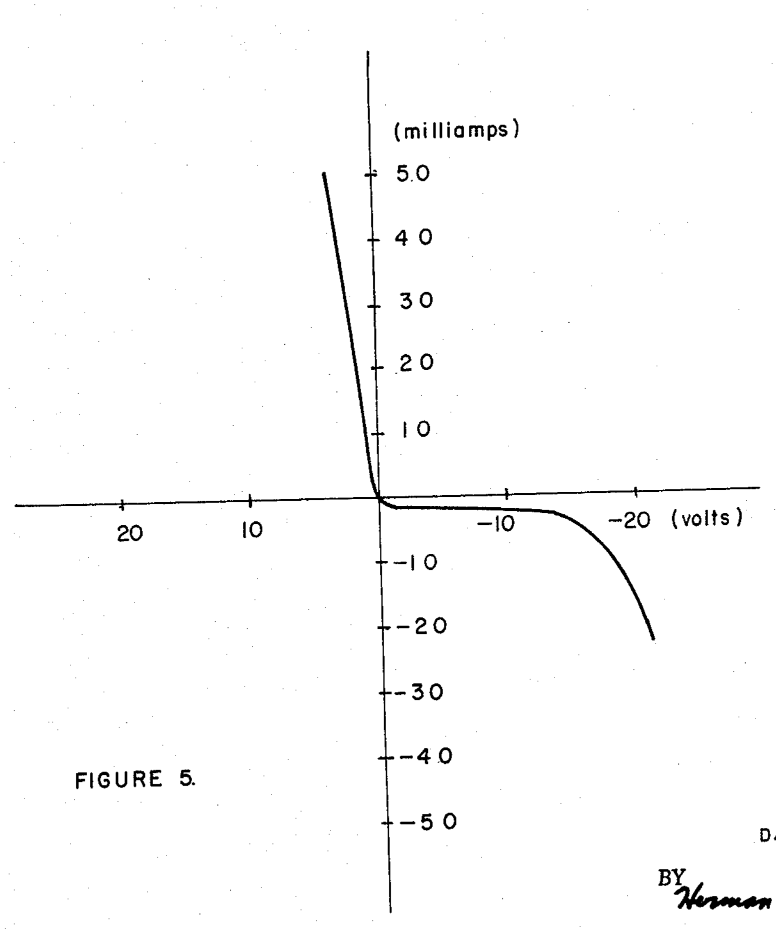

FIGURE 5 is a graph of the data obtained, being a plot of the voltage in volts against the current flowing through the rectifier in milliamperes and indicates a rectification ratio of about 100:1 and a back voltage of 20 volts without breakdown of the diode.

When Example 8 is repeated using other higher boron phosphides of this invention, comparable rectification ratios and back-voltages are obtained.

As an alternative, but less preferred embodiment of this invention, the same procedure recited in Examples 7 and 8 may be followed wherein the conducting surface of silver paint is omitted and the electrode 4 is fused, soldered, or welded directly to the semiconductor body.

It is indicated hereinabove that tungsten or molybdenum having 10% by weight based on tungsten or molybdenum of cadmium or tellurium is useful for making ohmic or rectifying contacts to $B_6P$, and zinc or selenium, respectively, could be used to replace the cadmium or tellurium. Actualy, mercury, beryllium, or magnesium can be used instead of zinc or cadmium, and oxygen, sulfur, or polonium can be used instead of selenium or tellurium; however, magnesium, beryllium, cadmium, or zinc or mixtures thereof and selenium or tellurium or mixtures thereof are the preferred elements to use. Normally, it will be desirable to use not more than about 20%, preferably not more than about 15% by weight of the Group II–B elements, i.e., zinc, cadmium or mercury, magnesium and beryllium or Group VI–B elements, i.e., oxygene, sulfur, selenium or tellurium in the tungsten or molybdenum based on the tungsten or molybdenum; however, larger amounts can be used, but in any event, the mixture of tungsten or molybdenum and these elements should consist primarily of tungsten or molybdenum on a weight basis, that is, tungsten or molybdenum having minor amounts of these elements therein. Other conductors than these, having high melting points, can be used, for example, iron, silver, gold, platinum, and platinum alloys such as platinum-rhodium, etc. The only requirement is that the conductor have a melting point higher than the operating temperature of the semiconductor device. The Group II–B doping agents, i.e., zinc, cadmium or mercury, magnesium and beryllium or Group VI–B doping agents, oxygen, sulfur, selenium or tellurium would be incorporated in these other metals in the same proportion as they were in tungsten or molybdenum for the devices of FIGURES 2 and 4.

Although the invention has been described in terms of specified apparatus which is set forth in considerable detail, it should be understood that this is by way of illustration only and that the invention is not necessarily limited thereto, since alternative embodiments in operating techniques would become apparent to those skilled in the art in view of the disclosure. Accordingly, modifications are contemplated which can be made without departing from the spirit of the described invention.

What is claimed is:

1. A high temperature rectifying device comprising a semiconductor body of a crystalline boron phosphide having a boron-to-phosphorus atomic ratio within the range of from 6 to 1 to 100 to 1, a high melting point conductor attached to said semiconductor body forming an ohmic junction thereon, and a rectifying contact electrode attached to and forming a P–N junction with said semiconductor body.

2. A high temperature rectifying device comprising a semiconductor body of a crystalline boron phosphide having a boron-to-phosphorus atomic ratio within the range of from 6 to 1 to 100 to 1, a conducting surface film on a portion of said body to facilitate electrical connections thereto, a high melting point conductor attached to said semiconductor through said conducting surface and making ohmic contact therewith and a rectifying contact electrode attached to and forming a P–N junction with said semiconductor body.

3. The rectifier of claim 2, wherein said conductor has a minor amount of an element selected from the group consisting of zinc, cadmium, mercury, oxygen, sulfur, selenium, tellurium, magnesium and beryllium, said conductor being fused to said semiconductor body.

4. The rectifier of claim 2, wherein said rectifying contact electrode has a minor amount of an element selected from the group consisting of zinc, cadmium, mercury, oxygen, sulfur, selenium, tellurium, magnesium and beryllium of the opposite conductivity type than said semiconductor body.

5. The rectifier of claim 4, wherein said semiconductor body is an n-type hexaboron phosphide having the formula $B_6P$, said conductor is tungsten and said element therein is tellurium and said rectifying contact electrode is tungsten and said element therein is cadmium.

6. The rectifier of claim 4, wherein said semiconductor body is a n-type hexaboron phosphide having the formula $B_6P$, said conductor is tungsten and said element therein is cadmium and said rectifying contact electrode is nickel and said element therein is tellurium.

7. The rectifier of claim 2, wherein said conducting surface film is a noble metal paint.

8. A high temperature power rectifier comprising an n-type semiconductor body of crystalline boron phosphide having a boron-to-phosphorus atomic ratio within the range of from 6 to 1 to 100 to 1, a molybdenum conductor having therein not more than about 15% by weight based on molybdenum of selenium fused to one side of said wafer forming an ohmic junction therewith, and a molybdenum rectifying contact electrode having therein not more than about 15% by weight based on molybdenum of zinc fused to the other side of said wafer forming a P-N junction.

9. The rectifier of claim 8, wherein the said boron phosphide has the formula $B_6P$.

10. A high temperature power rectifier comprising a p-type semiconductor body of crystalline boron phosphide having a boron-to-phosphorus atomic ratio within the range of from 6 to 1 to 100 to 1, a molybdenum conductor having therein not more than about 15% by weight based on molybdenum of zinc fused to one side of said wafer forming an ohmic junction therewith, and a rectifying contact molybdenum electrode having therein not more than about 15% by weight based on molybdenum of selenium fused to the other side of said wafer forming a P-N junction.

11. The rectifier of claim 10, wherein the said boron phosphide has the formula $B_6P$.

12. A high temperature diode comprising a semiconductor body of a crystalline boron phosphide having a boron-to-phosphorus atomic ratio within the range of from 6 to 1 to 100 to 1, a high melting point conductor attached to said semiconductor body forming an ohmic junction thereon, and a rectifying contact electrode in the form of a small bead attached to and forming a P-N junction with said semiconductor body.

13. A high temperature diode comprising a semiconductor body of a crystalline boron phosphide having a boron-to-phosphorus atomic ratio within the range of 6 to 1 to 100 to 1, a conducting surface film on a portion of said body to facilitate electrical connections thereto, a high melting point conductor attached to said semiconductor body through said conducting surface and making ohmic contact therewith and a rectifying contact electrode attached to and forming a P-N junction with said semiconductor body.

14. The diode of claim 13 wherein said conductor has a minor amount of an element selected from the group consisting of zinc, cadmium, mercury, oxygen, sulfur, selenium, tellurium, magnesium and beryllium, said conductor being fused to said semiconductor body.

15. The diode of claim 14 wherein said rectifying contact electrode has a minor amount of an element selected from the group consisting of zinc, cadmium, mercury, oxygen, sulfur, selenium, tellurium, magnesium and beryllium of the opposite conductivity type than said semiconductor body and said conducting surface film is a noble metal paint.

16. The diode of claim 15 wherein said semiconductor body is n-type, said conductor is tungsten and said element therein is tellurium and said rectifying contact electrode is tungsten and said element therein is cadmium.

17. The diode of claim 15 wherein said semiconductor body is p-type, said conductor is molybdenum and said element therein is cadmium and said rectifying contact electrode is molybdenum and said element therein is tellurium.

18. The diode of claim 16 wherein said semiconductor body is the boron phosphide having the formula $B_6P$.

19. The diode of claim 17 wherein said semiconductor body is the boron phosphide having the formula $B_6P$.

References Cited in the file of this patent

FOREIGN PATENTS 719,873 Great Britain ---------- Dec. 8, 1954

UNITED STATES PATENT OFFICE

CERTIFICATE OF CORRECTION

Patent No. 3,147,412 September 1, 1964

Dale E. Hill

It is hereby certified that error appears in the above numbered patent requiring correction and that the said Letters Patent should read as corrected below.

Column 2, line 72, for "disociation" read -- dissociation --; column 3, line 2, for "procceed" read -- proceed --; line 3, for "produce" read -- product --; same column 3, line 6, for "of" read -- on --; column 5, line 59, for "train" read -- strain --; column 8, line 53, for "Actualy" read -- Actually --; line 63, for "oxygene" read -- oxygen --; column 9, line 52, for "n-type" read -- p-type --.

Signed and sealed this 2nd day of March 1965.

(SEAL)
Attest:

ERNEST W. SWIDER
Attesting Officer

EDWARD J. BRENNER
Commissioner of Patents